No. 609,652. Patented Aug. 23, 1898.
G. BEEKMAN.
SAFETY DEVICE FOR BICYCLES.
(Application filed Sept. 4, 1897.)

(No Model.)

Witnesses:
H. R. McDonald
Philip H. Lett.

Inventor.
Gerard Beekman,
by Henry F. Parker,
his Attorney.

THE NORRIS PETERS CO., PHOTO-LITHO., WASHINGTON, D. C.

UNITED STATES PATENT OFFICE.

GERARD BEEKMAN, OF NEW YORK, N. Y.

SAFETY DEVICE FOR BICYCLES.

SPECIFICATION forming part of Letters Patent No. 609,652, dated August 23, 1898.

Application filed September 4, 1897. Serial No. 650,630. (No model.)

*To all whom it may concern:*

Be it known that I, GERARD BEEKMAN, a citizen of the United States, and a resident of the city, county, and State of New York, have invented certain new and useful Improvements in Safety Devices for Bicycles, of which the following is a specification.

My invention relates to safety devices for chain-propelled bicycles, the object being to stop the machine in the event of the chain accidentally breaking or parting; and said invention is particularly applicable to bicycles having chain-operated brakes or a crank-and-chain propelling mechanism wherein a braking device is applied to the crank-shaft or front sprocket-wheel or other forward part of the propelling mechanism in such manner that the resistance of the brake is transmitted to the rear or traction wheel through the chain, which if broken would cause the rider to lose control of his machine.

My invention consists in an automatic stop device arranged in the rear sprocket-wheel, which is prevented from acting while the chain is on the wheel, but is released in the event of the chain falling from the under side of the wheel, said device being adapted to engage with a suitable projection on the frame and promptly stop the wheel.

Figure 1:
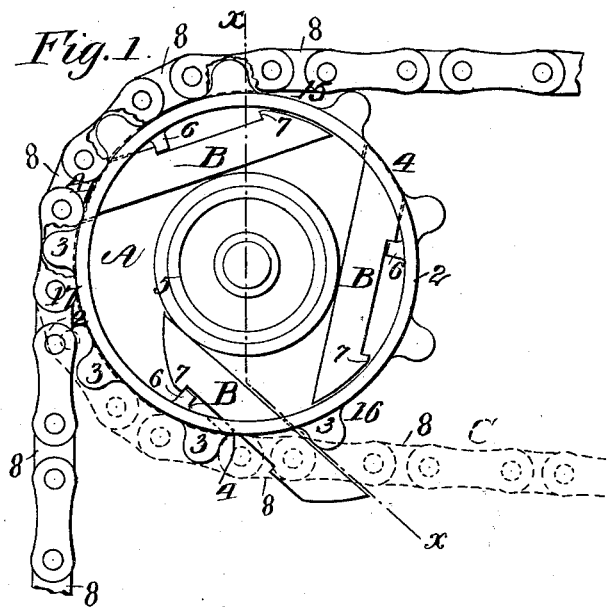
Figure 3:
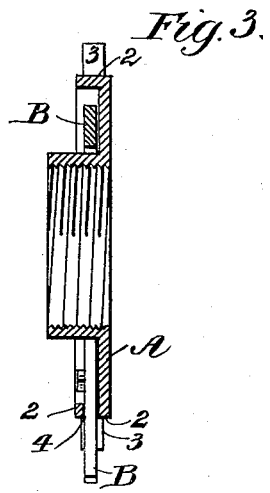
Figure 2:
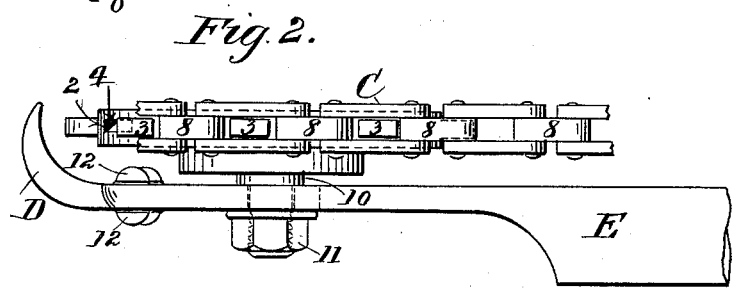
Figure 4:
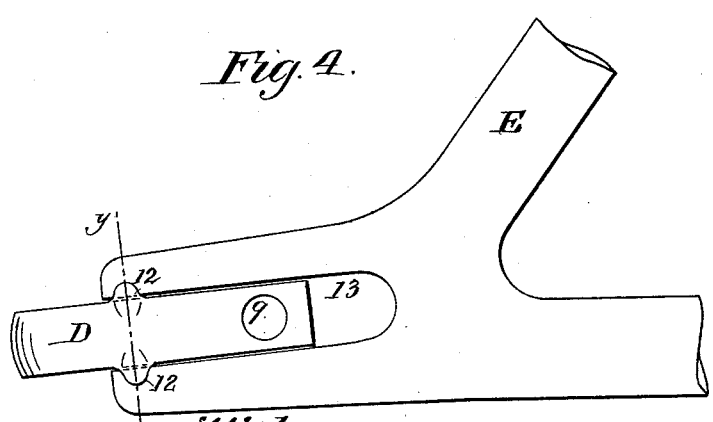
Figure 5:
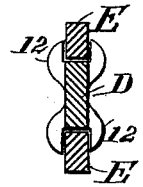

Referring to the accompanying drawings, Figure 1 is a side view of the rear spocket-wheel of a bicycle having my invention attached, showing a broken chain and one of the stop-latches projected. Fig. 2 is a top edge view of said wheel, also showing a portion of the bicycle-frame. Fig. 3 is a cross-sectional view of the said wheel, taken at $x\ x$, Fig. 1, omitting the chain and showing the stop-latches. Fig. 4 is a side view of a portion of the bicycle-frame, showing a part of my improved device attached thereon, the spindle being omitted. Fig 5 is a cross-section at $y\ y$, Fig. 4.

The sprocket-wheel A has its rim 2 mortised at suitable intervals at points between the sprocket-teeth 3 at 4 4 4, and gravity-latches B are inserted at suitable angles, such as shown, the same being guided by contact with the hub 5 and a stop 6, which latter also engages the shoulder 7 to prevent the latch from dropping entirely out.

The solid portions 8 of the chain C (which is partly shown in Figs. 1 and 2) by their contact with the rim 2 cover the mortises 4, as indicated by dotted lines in Fig. 1, at the time when the successive latches B pass through a position in which they may gravitate if released, and in the event of breakage or parting of the chain C the latch which happens to be in the lowest part of the wheel A will immediately drop out to the position shown in Fig. 1.

D is a strong projection capable of sliding in the frame E and shaped so as to extend close to the wheel A and obstruct the latch B when thrown out. The projection D shown in the drawings is constructed to fit the ordinary design of the frame E, having an eye 9 to receive the spindle 10 and having lugs 12, adapted to engage with the sides of the slot 13 of the frame. The nut 11 when tightened clamps to the frame simultaneously the spindle 10 and the projection D, thus maintaining a fixed relation between the rear sprocket A and the outer hooked end of D, regardless of the tension on the chain.

In operation it is intended that the latches B and stop D shall be strong enough to withstand positive contact when the bicycle is in motion and arrest the rear or traction wheel, so that it will slide on the ground until the momentum of the bicycle and its rider is overcome, thus promptly stopping the bicycle in the event that the chain should part while applying a brake or while the rider is back-pedaling in an emergency.

Owing to the tangential angles at which the slides or latches B are arranged they cannot gravitate outward at the uncovered part 15 16 of the wheel A, and they can only gravitate after they have passed a level position at the normally-covered portion 16 17 of the wheel when it is uncovered by the chain dropping.

Having thus fully described my invention, what I claim, and desire to secure by Letters Patent, is—

1. In a crank-and-chain propelling mechanism, the combination with the driven sprocket-wheel, of latches arranged on said wheel so that they are retained by the chain, and adapted when the chain leaves its normal position on said wheel, to become projected, and a suitable stop device located to engage said latches and arrest said wheel when the latches or any of them are projected.

2. In a crank-and-chain propelling mechanism, the combination with the driven sprocket-wheel, of gravity-latches arranged on said wheel so as to be retained by the drive-chain and to gravitate into a projected position when the chain leaves its normal position, and a suitable stop to engage said latches when projected.

3. The combination with a chain-driven sprocket-wheel of tangential gravity slides or latches arranged on said wheel at angles so adapted that they are retained by gravity upon the uncovered part of the wheel and retained by the chain at a covered portion of the wheel, but released by gravity at said portion when the chain leaves its normal position, and a suitable stop device for engaging said latches.

Signed in the city, county, and State of New York this 2d day of September, A. D. 1897.

GERARD BEEKMAN.

Witnesses:
CHARLES E. FRANCIS,
EDGAR D. HOWLAND.